US005508917A

United States Patent [19]

Siegle et al.

[11] Patent Number: 5,508,917

[45] Date of Patent: Apr. 16, 1996

[54] VEHICLE GUIDANCE SYSTEM USING BEACON TRANSMISSIONS OF DESTINATION DATA

[75] Inventors: Gert Siegle, Berlin; Peter Braegas, Hildesheim; Wolf Zechnall, Hildesheim-Sorsum, all of Germany

[73] Assignee: Robert Bosch GmbH, Stuttgart, Germany

[21] Appl. No.: 39,336

[22] PCT Filed: Nov. 27, 1991

[86] PCT No.: PCT/DE91/00926

§ 371 Date: Mar. 24, 1994

§ 102(e) Date: Mar. 24, 1994

[87] PCT Pub. No.: WO92/10824

PCT Pub. Date: Jun. 25, 1992

[30] Foreign Application Priority Data

Dec. 13, 1990 [DE] Germany .......................... 40 39 887.0

[51] Int. Cl.[6] .................................................. G01C 21/00

[52] U.S. Cl. ................................ 364/424.02; 364/424.01

[58] Field of Search .................................... 364/443, 444, 364/447, 454; 340/937, 988

[56] References Cited

U.S. PATENT DOCUMENTS

| | | | |
|---|---|---|---|
| 4,357,593 | 11/1982 | Von Tomkewitsch | 340/23 |
| 4,420,682 | 12/1983 | Huber | 235/472 |
| 4,914,605 | 4/1990 | Loughmiller, Jr. et al. | 395/132 |
| 5,101,200 | 3/1992 | Swett | 340/937 |
| 5,101,510 | 3/1992 | Duckeck/Bosch | 455/186 |
| 5,187,810 | 2/1993 | Yoneyama et al. | 455/34.1 |
| 5,274,560 | 12/1993 | Larue | 364/444 |

FOREIGN PATENT DOCUMENTS

| | | |
|---|---|---|
| 0263332 | 4/1988 | European Pat. Off. . |
| 0317181A2 | 5/1989 | European Pat. Off. . |
| 3905493 | 8/1990 | Germany . |

OTHER PUBLICATIONS

Brägas & Deuper, "Von ALI zum IVB," Bosch Technische Berichte, vol. 8, No. 1, pp. 26–31, Robert Bosch GmbH, Stuttgart, 1986.

Automotive Electronics Journal, Jan. 29, 1990, p. 19.

Von Tomkewitsch, "Dynamic Route Guidance and Interactive Transport Management with ALI–Scout," IEEE Transactions on Vehicular Technology, vol. 40, No. 1, pp. 45–50, Feb. 1991.

Christopher O'Malley, "Electronics as Your Co–Pilot," Popular Science, Sep. 1991, pp. 66–69.

*Primary Examiner*—Kevin J. Teska
*Assistant Examiner*—Dan Fiul
*Attorney, Agent, or Firm*—Frishauf, Holtz, Goodman, Langer & Chick

[57] ABSTRACT

A vehicle and destination guidance system is proposed wherein a destination can be input by entering the destination and the street in clear language into a vehicle device. The vehicle device is in communication with a beacon device in which, in addition to the various destinations, street names and the associated coordinates are stored. On demand by the vehicle device, the beacon device selects the associated destination coordinates and transmits them to the vehicle device. Additional data can be transmitted in the transmitted telegram which, for example, contain traffic information or street maps. The system is also usable for automatic toll deductions.

14 Claims, 4 Drawing Sheets

VEHICLE GUIDANCE SYSTEM USING BEACON TRANSMISSIONS OF DESTINATION DATA

FIELD OF THE INVENTION

The invention relates to a vehicle and destination guidance system.

BACKGROUND

The vehicle and destination guidance system "Ali-Scout" is known from Bosch Technische Berichte, [Technical Reports], Vol. 8 (1986), Issue 1/2, pages 26 to 31, in which the destination can be entered in the form of coordinates by means of an alphanumeric keyboard and wherein coordinate data taken from a street map can be entered in an internal memory. Previously entered destinations with an abbreviated name can be selected by means of a "step" key through a display scroll method.

Furthermore, a map-supported locating and navigation system "Travelpilot" is known, wherein the entire road system of Germany is stored on a compact disc and is available to the locating and navigation system. However, it has been found that the internal memory of the system needs to be quite extensive, or that a relatively expensive CD device is required if a great many destinations must be stored by their coordinates. Taking into consideration that the memory then needs to be present in practically every vehicle, the result is a very extensive technical outlay with correspondingly high costs.

SUMMARY OF THE INVENTION

In contrast thereto, the vehicle and destination guidance system of the invention has the advantage that the memory requirements in the vehicle can be kept relatively small, because it is needed only for the intermediate storage of the names which were entered or only for defined simple search functions. Because it only contains place names with the coordinates of the centers of these places, its capacity is limited to a size which can be displayed on integrated circuits which today are commercially available. Another advantage can also be seen in that the data stored in the beacon can be adapted continuously to the actual conditions by means of a centrally controlled device. Furthermore, for control purposes, the vehicles passing the beacons can be counted and routed in preset directions.

Of particular advantage in this connection is the use of an RDS-TMC (Radio Data System—Traffic Message Channel) memory which only needs to be slightly changed because place names are already stored in it. Only the supplemental geographic coordinates of a street map need to be stored for these place names. Because of this the vehicle device can be inexpensively manufactured. Advantages also result from the use of the system for control and test purposes which can be automatically performed and which are the result of checks for entry permits and/or fee deductions in connection with parking and tolls.

It is particularly advantageous that the street names of destinations or data regarding street maps with the appropriate coordinates are stored in the beacon memory. This memory always contains up-to-date street data and can be interrogated by any number of vehicles.

A particular advantage is to be seen in that the map display in the near vicinity of the beacon takes place in a detailed manner, so that orientation is made easier for the driver.

Since the transmission of a guidance vector chain is sufficient at a greater distance from the destination, the output of the route to be driven can be designed to be very simple. The output of simple route symbols in particular is possible. A map display in color is particularly advantageous for improving overall clarity.

Because the range of the beacon transmitting/receiving device is relatively short, individual destination guidance in areas without a beacon infrastructure takes place by means of compound locating in a locating and navigation system. The transmission of the position coordinates of an adjacent beacon is particularly helpful for arranging the navigation system or for correcting the coupled positional data. By means of transmitting the coordinates of the location of the beacon, it is possible to determine the position exactly to within a few meters.

An acoustical data output with destination guidance and/or traffic advisories is advantageous in particular for city driving, because the driver can concentrate totally on the traffic and is not distracted by looking at the display.

Further advantages result from the capability of the vehicle and destination guidance system to make possible the automatic deduction of tolls without further great outlay. Further advantages of the invention can be found in the description.

DRAWINGS

An exemplary embodiment of the invention is illustrated in the drawings and explained in detail in the subsequent description.

Figure 4A:
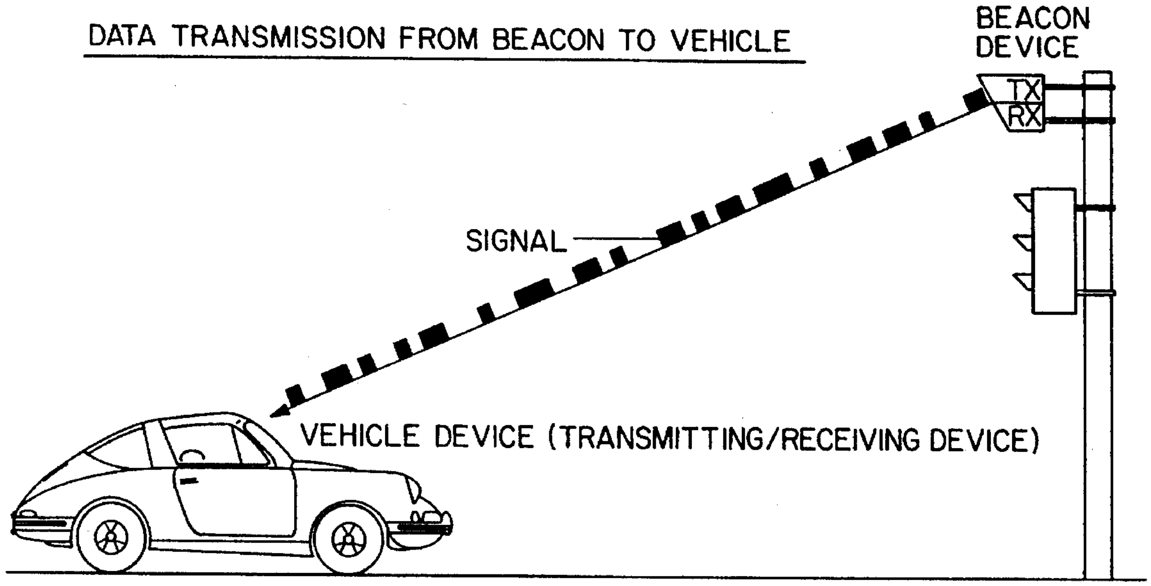
Figure 4B:
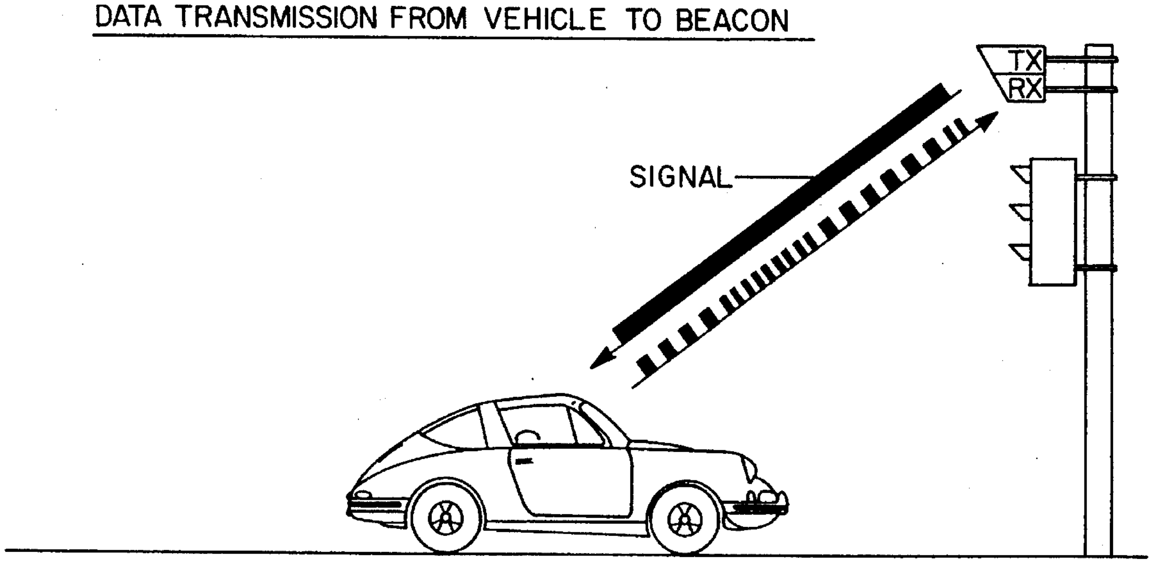

FIGS. 4*a*, 4*b* are a functional view of the exemplary embodiment.

DETAILED DESCRIPTION OF THE EXEMPLARY EMBODIMENT

Figure 1:
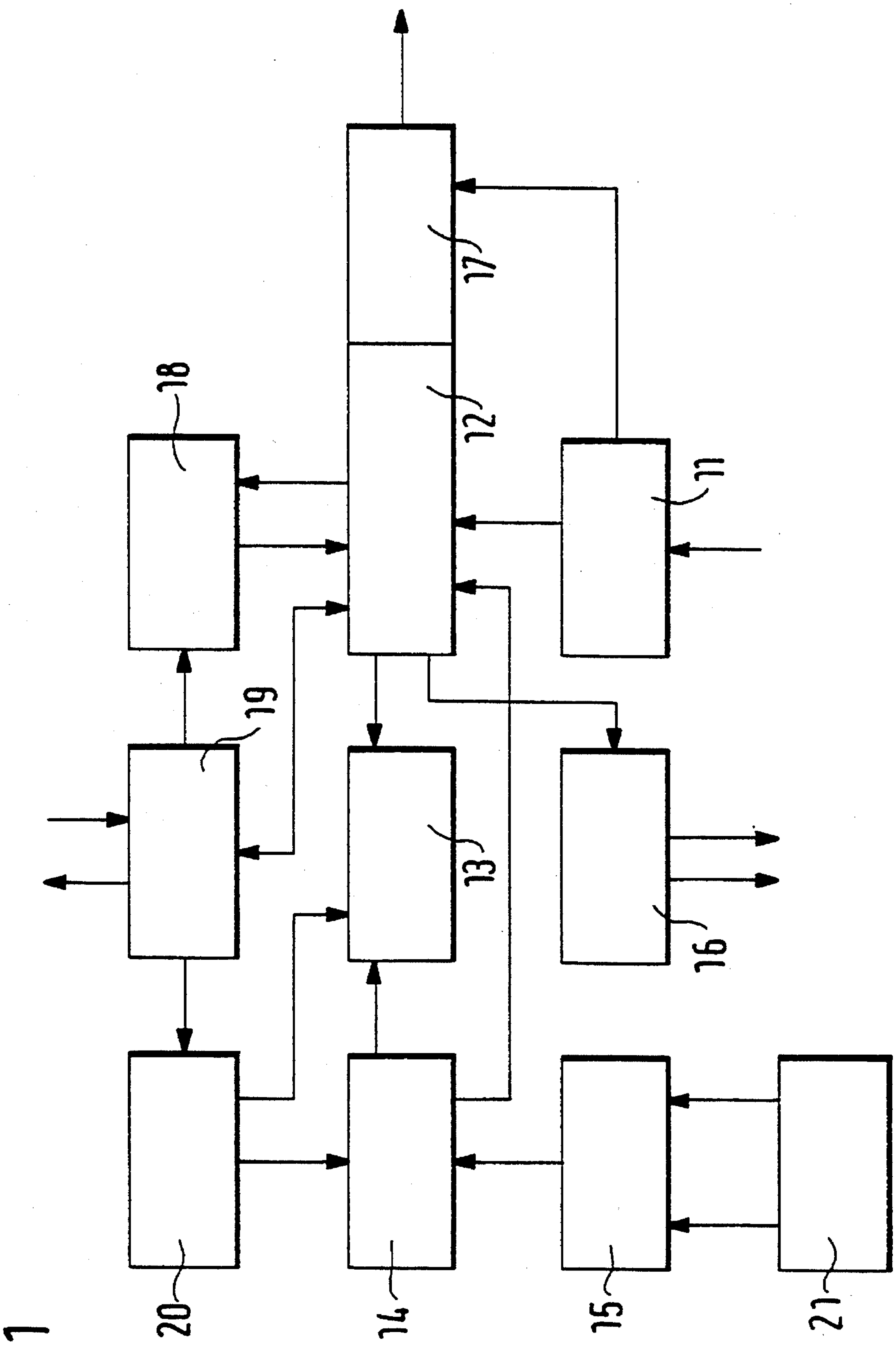
FIG. 1 is the block diagram of a vehicle device.

Basically, the vehicle and destination guidance system has two component devices: a vehicle device and a stationary beacon device. The block diagram of the vehicle device in accordance with FIG. 1 shows essential functional parts of the invention. An input unit 11 is connected with the control unit 12, which has a destination memory 17 for place names and their coordinates. The control unit 12 is connected with a display 13 for the output of traffic guidance information. There are also connections with the car radio, particularly to the memory of the receiver section of the traffic message channels (TMC) and for audio output 16 to the LF amplifier of the car radio. A locating and navigation system 21 has a compass, wheel sensors, a device 15 for compound locating and a device 14 for map matching for the coordination detection by means of map comparison. Furthermore there is a map memory 20 for storing map data transmitted by the beacon. The map matching device 14 is connected with the map memory 20. A connection with the display 13 is provided for displaying the map data and the position of the vehicle. The map matching device 14 is also connected with the control unit 12. Another output of the control unit 12 leads to a further intermediate memory 18 for received guide vector chains.

A transmitting/receiving unit 19 is connected with the control unit 12 as well as with the intermediate memory 18 and the map memory 20. The transmitting/receiving unit contains known transmitting and receiving stages for a desired frequency band.

Figure 2:
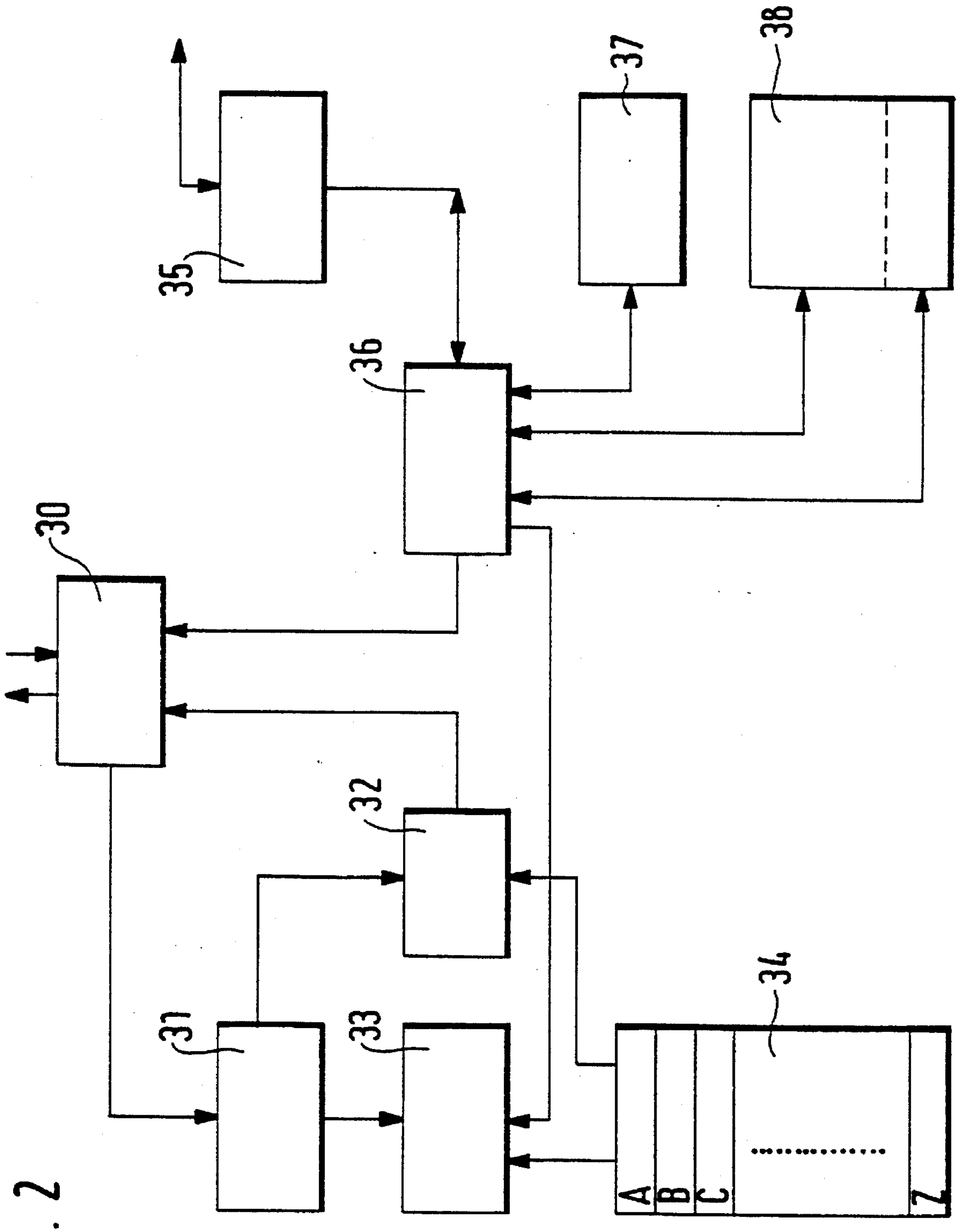
FIG. 2 is the block diagram of a beacon device.

In the block diagram of the beacon device in accordance with FIG. 2, the transmitting and/or receiving unit 30 is first connected with an inquiry register 31. The inquiry register 31 is connected with a name comparator 33 which has access to the street name memory 34. The inquiry register is furthermore connected via a vehicle number register 32 which in turn also has access to the street name memory 34. To transmit information to the vehicle, the vehicle number register 32 is also connected with the transmitting and/or receiving unit 30.

A control unit 36 is connected on the one side with the transmitting-receiving unit 30 and on the other with various memories, such as the guide vector chain memory 37 and the memory 38 for street maps in the near and far areas. The control unit 36 furthermore is connected via an interface 35 with a central computer, not shown, by means of which a plurality of beacon devices can be controlled.

Furthermore, the beacon device can be equipped with a receiving unit for the Radio Data System (RDS-TMC), particularly if control via a central computer is lacking.

Figure 3:
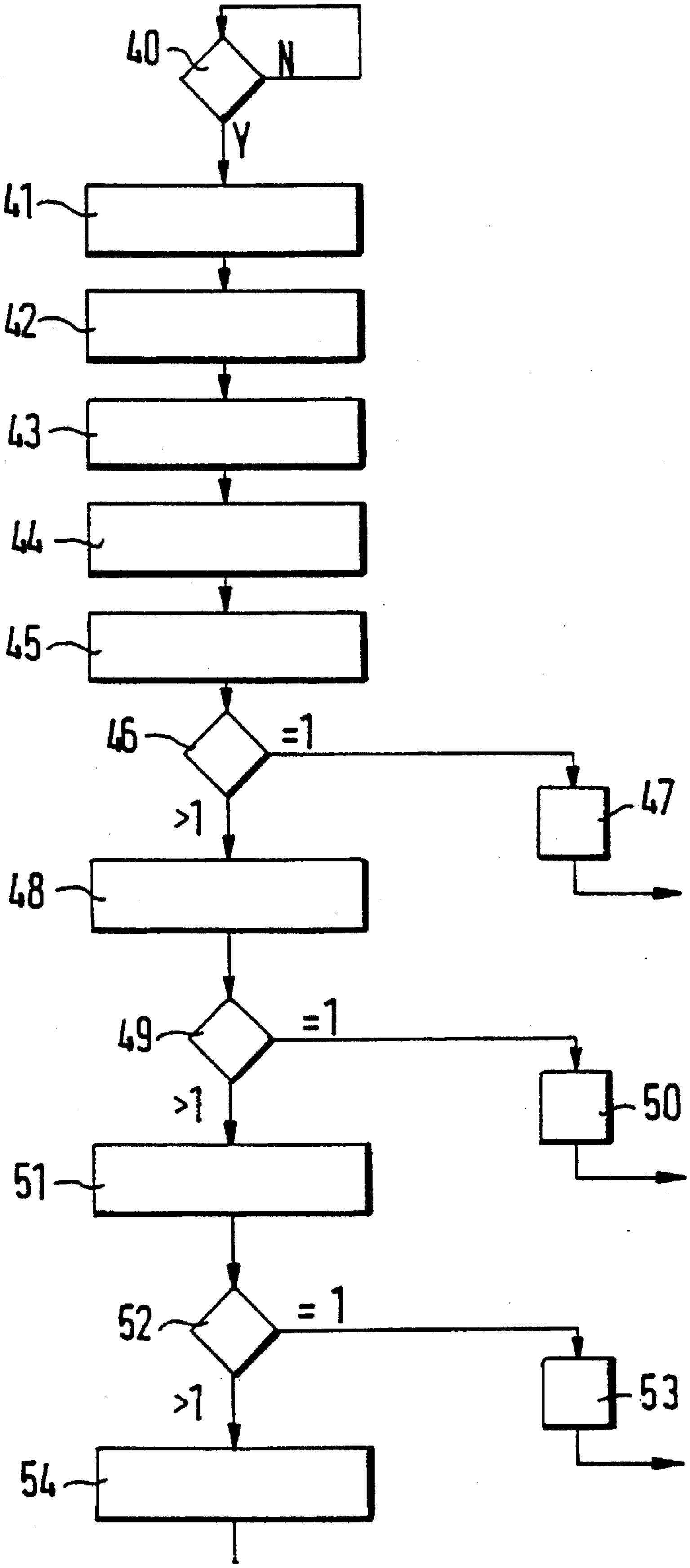
FIG. 3 is a flow diagram.

A flow diagram for searching for street names in the memory of the beacon device is shown in FIG. 3. First, an interrogation is performed in position 40 whether there is a request for a search for pairs of coordinates of a street name. As long as there is no such request, the control remains in this loop. However, if there is a request, the name of the desired street is stored in a register in position 41. The first, second and third letters of the name are determined in positions 42 to 44. A search for names having this combination of letters is performed in position 45. Once the word containing the three previously defined letters has been found, the name found constitutes the search word. In position 47 it is transferred to the control unit 36, together with the associated coordinate pair. The search run is now terminated and the program again starts in position 40.

However, if a number of names with this letter combination was found, the fourth letter is determined in position 48 and a search for all names with this letter combination is performed. The same interrogation as in position 46 is performed in position 49. If a searched-for name is now present, the associated pair of coordinates is then output in position 50 to the control unit 36 and a return to the program start in position 40 is initiated.

If again a number of names were found, the operation is repeated by determining the fifth letter in position 51. In the subsequent interrogation 52, the output of the data found to position 53 or continued decoding of a sixth letter in position 54 takes place. This search run is continued until the searched for name has been found and its coordinate pair has been determined.

The function of the exemplary embodiment will be described in detail below:

The vehicle and destination guidance system has a modularly constructed vehicle device comprising various components of the location and navigation system (optional), an input and output device for destinations, street maps and/or indications for the direction of travel in the form of arrow symbols or audible output. It is considered to be particularly advantageous that the input of the destination (place and street) is performed in plain language, wherein the coordinates for the desired street are taken from the memory of the beacon device. The memory of the beacon device is comparatively large, while the vehicle memory is designed relatively small and is therefore inexpensive to manufacture. To save memory space, a link with the memory of a car radio is provided. The use of the memory of the device for decoding traffic message channels (TMC) is particularly advantageous, because place names have already been stored therein. It is only necessary to store the coordinates of centers of locations which are part of the place names.

The vehicle and destination guidance system, while preserving anonymity to a large degree, is used to assist the driver of a vehicle in searching for his destination. In addition to street maps or route suggestions, it contains information regarding the state of traffic, backups, detours, icy roads, etc. The system can also be used for the automatic processing of entry permits, deduction of parking fees or tolls for roads or places requiring tolls, because the vehicles can be detected through induction coils embedded in the road and can be individually addressed by means of the beacon devices.

The mode of operation of the vehicle and destination guidance system will be described in detail by means of an example. A driver wants to drive from Hannover to Hildesheim to the "Blauer Kamp" street. He first enters the destination Hildesheim and then the street name "Blauer Kamp" in plain language in the input unit 11 by means of the keyboard or a remote control. The control unit 12 first stores the input data and represents them on the display 13 for checking purposes. In the first word the control 12 of the vehicle recognizes the place name "Hildesheim" and searches the destination memory 17 for the corresponding coordinates for the center of the place Hildesheim. If a TMC memory is available, the respective data are taken from this memory. Storage of place names in a TMC memory is known from German Published, Non-Examined Patent Application DE-OS 38 10 180 and DE-OS 39 14 104.

Based on the coordinates of its present location and those of the destination "Hildesheim" the vehicle device calculates the direction and distance of the destination in accordance with known trigonometric formulas and indicates these values on the display 13. The driver now proceeds in this direction until he passes a first beacon, for example at the connector "Anderten" to the Autobahn A7.

When passing this beacon, the vehicle receives the following information, broadcast collectively and cyclically by the beacon:

1. Coordinate pair of the center of the location of the municipality in the area of which the beacon is located (OMK [location center coordinates] of Anderten), 2. Coordinate pair of the exact location of the beacon (with offset), 3. Digitized road net in exact form as far as the next beacon but one, beyond that on a reduced scale (long distance road net), 4. Colored area information (outlines and type of color), 5. Route tree (collective guide vector chain), if necessary arranged by types of vehicles, 6. Time slots for random numbers for interrogation by the vehicle.

The vehicle device now checks to determine whether the coordinates of the center of the location (OMK) of Hildesheim are identical with those of the beacon location (Anderten). Because this is not the case, the vehicle device searches the route tree received from the beacon for the guide vector chain associated with the OMK of Hildesheim, A7 in the example, and represents it on the display 13. If desired, a complete road map can be shown. The map can be displayed at various scales.

During passage, there is the opportunity of transmitting information intended for traffic control purposes from the vehicle to the beacon. This information can consist of the travel time since passing the previous beacon and perhaps an individual vehicle identification. This information is transmitted to the beacon in the form of a telegram in the time slot of its self-generated random number.

The above described operation is repeated from beacon to beacon until the vehicle device recognizes identical OMKs for the beacon and the destination Hildesheim.

Within the time slot of its self-generated random number, the vehicle transmits a telegram containing the following information:

1. Travel time since passing the previous beacon,

2. The street name selected as the destination (for example Blauer Kamp),

3. If desired, the individual vehicle identification.

For the time slot process the vehicle device selects a defined random number as the vehicle code and transmits it to the beacon. The beacon can now transmit the individual data (for example the coordinates of the desired street, house number, hotel, gas station, etc.) in a directed way to the vehicle by means of this random number.

The coordinate pair associated with the street name is now determined with the help of the search tree method illustrated in FIG. 3 in the beacon device in which the street names of Hildesheim with their associated coordinates are stored and transmitted back to the vehicle device, together with the street name and the random vehicle number, within a fixed amount of time (approximately 100 ms).

The guide vector chain which leads to the destination area in which the street "Blauer Kamp" is located is now determined in the vehicle device with the aid of this coordinate pair from the route tree and is displayed. If the destination is located in the exactly displayed near range, the guide vector chain leads directly to the selected street (for example "Blauer Kamp"). If no further information, such as house number or hotel, is available, it is provided to indicate the respective point of the street which lies closest to the travel route.

If additional beacons are located on the way to the destination, it is also possible to transmit a guide vector chain as far as the beacon which is located closest to the destination "Blauer Kamp".

The search algorithm for decoding the street "Blauer Kamp" will be described in what follows. The transmitting-receiving device receives the telegram and first stores it in the inquiry register 31. Then, the street name and the vehicle are decoded in the name comparator 33 or register 32. The street name register 34 has several sections which are arranged alphabetically so that they can be found rapidly in accordance with the search tree method.

In accordance with FIG. 3, for searching for the street name first the program is started in the position 40 and the street name "Blauer Kamp" is stored in position 41. To save storage space it is practical generally to use capital or lower case letters.

The first three letters, namely "BLA" of the search word are decoded in positions 42 to 44. The memory section in which all words with the letters "BLA" are contained is now searched in position 45. The interrogation in position 46 is such that only a search is made whether one or several words with this letter combination are present. If there is only a single word, the search is completed. The associated coordinate pairs are now transmitted to the vehicle via the transmitting/receiving device 30.

If the word has not yet been found, the next letter, "U" in the example, is decoded and the new search word "BLAU" is now determined and the corresponding memory section is read out in position 48. The same interrogation as already performed in position 46 now takes place in position 49. This search structure is continued until the searched for name "Blauer Kamp" has been found (positions 50 to 54).

Now, since the coordinates of the destination "Blauer Kamp" are known, the distance to the destination can be determined. The distance can be output in the audio output 16 via the LF amplifier of the car radio or can be visually represented via the data output, namely the display 13.

In further embodiment of the invention it is provided to store the complete street net and its coordinates in all beacon devices. These data for Germany, for example, can be stored on a compact disc. Now, because the next beacon contains all destination data, the vehicle can be guided in the following manner.

Based on the coordinate pair, it is possible to pick out the sequence of road sections (guide vector chain) leading in the direction to the destination in the beacon and transmit it to the vehicle. Because the beacon located in the vicinity of the vehicle knows the coordinates of the destination, it can send a road map to the vehicle which represents the momentary position of the vehicle and which is continuously changed as long as the vehicle moves in the direction toward the destination. When the vehicle comes into the range of a further beacon, this beacon takes over the guidance function in the same manner and guides the vehicle on to the next beacon, and so on until the vehicle has reached its destination. These guide vector chains make possible the successive guidance of the vehicle as far as the destination. If the vehicle reaches an area that does not have a sufficient beacon infrastructure, continued navigation is performed with the location and navigation system 21 with the known device 15 for compound locating. Because within the range of a beacon its coordinates approximately correspond to the coordinates of the position of the vehicle, these position data can be compared with the position data coupled in by the location and navigation system 21 and corrected, if needed. In this way, the error of the location and navigation system 21 is reduced.

Because within the close range of the beacon a detailed map is transmitted from the beacon device to the vehicle device, it is also possible to display destinations such as hotels, train stations, post offices, banks, gas stations, and the like.

To improve the clarity, it is provided to design the street map in colors, so that main streets, one-way streets or important destinations and the displayed travel route are emphasized in colors.

The beacon device disclosed in the exemplary embodiment (FIG. 2) operates in the microwave frequency range at 5.8 GHZ Giga Hertz. In the range from 5.795 GHz to 5.815 GHz, four channels of band widths of respectively 5 MHz are available. For the data transmission from the beacon device to the vehicle device (FIG. 4*a*), amplitude modulation at a data rate of 1.125 Mbit/s is used. For this purpose the 5.8 GHz carrier signal is switched on and off as a function of the information bit. Modulation of this type is also known as ASK (amplitude shift keying) or OOK (on-off keying). For transmission and reception, the beacon device has respectively flat antennas in accordance with flat coaxial transmission strip technology (microstrip).

The vehicle device is also equipped with a flat coaxial transmission strip antenna. The advantage of the chosen ASK modulation method lies mainly in that the information can be obtained from the microwave signal with a simple envelope detector (diode). Thus an elaborate receiving arrangement in the vehicle device is not required.

In the case of data transmission from the vehicle to the beacon in accordance with FIG. 4*b*, the beacon device transmits an unmodulated 5.8 GHz carrier signal (CW signal) during the time slots provided therefor. This signal is received by the vehicle device, amplified, if necessary, and supplied to a modulator. In this example, the 5.8 GHz carrier signal is modulated by means of a diode with a frequency of either 1.5 MHz or 2.0 MHz, which is a function of the information bit, and subsequently retransmitted to the beacon device (transponder principle). The data rate here is 125 kbit/s.

In this way, besides the carrier, two side bands are generated in the frequency range, in each of which the information is contained in the form of an FSK (frequency shift keying) signal. The beacon device receives the microwave signal modulated by the vehicle device and performs a frequency transformation into the base band and then an FSK demodulation.

With the method herein described it is particularly advantageous that it is possible to use a microwave circuit in the vehicle device which is very simple in respect to the transmitting and receiving device and without its own oscillator and frequency transformer. This aids in the inexpensive manufacture.

The toll system is designed for automatic vehicle recognition and fee deduction. It contains two components, the so-called "on-board unit" (OBU) and the fixed station installed in the road. OBU and fixed station exchange coded information required for the toll determination via a microwave or infrared communications path. The detailed progression is as follows:

Upon entrance of a vehicle into a toll area, the OBU of the vehicle receives a signal from a first transmitter, generally mounted on a first overhead sign assembly or beacon, which activates a demodulator. The received signal contains data regarding the station code, the amount of toll and other key words for statistical evaluation. After checking validity, the "on-board unit" is activated. The OBU decodes the information received, deducts for example the amount of toll for the road to be travelled from a toll card, which can be inserted, for example as a credit card, into the toll device and prepares the acknowledgement report. Then the OBU returns to the stand-by mode.

A second transmitter which is generally mounted on a second overhead sign assembly or beacon, requests the acknowledgement report prepared by the OBU. The OBU is reactivated and transmits the acknowledgement report, repeated twice, to a receiver mounted on the same assembly. The road device checks the received acknowledgement and, if the result is positive, terminates the process. If no deduction was acknowledged, the license plates of the vehicle, preferably in the front and in the rear, are recorded, preferably by a video camera.

As a solution alternatively to the credit card it is provided to perform an automatic deduction from the account of the user. In this case the transmission of a personal identification is necessary to allow the deduction of the toll fees from the account of the user.

Practically no additional apparatus is required besides a card reader for the credit card, because control by means of a program takes place via the the already present vehicle and beacon devices.

The control device 12 or 36 of the vehicle as well as of the beacon have a microcomputer with a memory and input/output ports. They are controlled by a program which is structured in accordance with the specification. The further units, such as memory, display, etc. are devices known to one skilled in the art and need not be described in detail.

We claim:

1. A vehicle and destination guidance system with a vehicle device located in a vehicle having a data input device, a data output device, a destination memory for place names, with a data memory for road maps or guide vectors and with a first transmitting/receiving unit, and with at least one stationary device of a beacon located outside of the vehicle having a second transmitting/receiving unit which is in communication at least temporarily with the first transmitting/receiving unit located in the vehicle and which has a further data memory, in which at least one of a road map and guide vectors are stored which can be transmitted to the vehicle device, wherein a. the data input device (11) of the vehicle device is designed for entering with alphanumeric characters at least one of the place name and the street name of a selected destination, b. the destination memory (17) contains coordinates of centers (OMK) of the destinations which can be input, c. the vehicle device has means (11) through which a destination vector can be determined from the vehicle position and the coordinates of the center (OMK) of the destination and can be output in a display (13), and means to transmit data to the beacon device for identifying the destination, d. the beacon device includes means responsive to said selected destination received from the vehicle device to transmit to the vehicle as it passes the center coordinates (OMK) of at least one of the places associated with the beacon, and route tree with guide vector chains of the long distance route net, e. the vehicle device has means (12) to compare the received center coordinares with the destination coordinates for (a) in case of a deviation, providing a guide vector to the nearest beacon located in the direction toward the destination, and (b) in case of agreement, controlling the beacon device to transmit portions of at least one of the road map of the destination area and guide vectors to the destination to the vehicle device.

2. A vehicle and destination guidance system in accordance with claim 1, wherein the data memory (17) of the vehicle device is a component of the device for the traffic message channel (TMC memory) of a car radio.

3. A vehicle and destination guidance system in accordance with claim 1, wherein the memory of the beacon device contains further information regarding at least one of entry permits and fee deductions for parking fees and tolls.

4. A vehicle and destination guidance system in accordance with claim 1, wherein the digitized road net as far as only the next beacon is stored in the road map (34) of the beacon device.

5. A vehicle and destination guidance system in accordance with claim 1, wherein, on demand of a vehicle, a sequence of road sections (guide vector chain) containing the travel route in the direction toward the destination can be transmitted by the beacon to the vehicle.

6. A vehicle and destination guidance system in accordance with claim 1, wherein the output of the travel direction data takes place by means of at least one of arrow symbols and audible output at the data output.

7. A vehicle and destination guidance system in accordance with claim 1, wherein the output of the travel direction data is in the form of a map display.

8. A vehicle and destination guidance system in accordance with claim 7, wherein at least one of the travel route and the guide vector chain is shown in color.

9. A vehicle and destination guidance system in accordance with claim 1, wherein a locating and navigation device is provided in the vehicle, and correction of the compound navigation can be made on the basis of the coordinates received from the beacon.

10. A vehicle and destination guidance system in accordance with claim 1, wherein at least one of the vehicle device and the beacon device have an arrangement for deducting user fees for parking fees and tolls.

11. A vehicle and destination guidance system in accordance with claim 10, wherein the beacon device registers the movement of a vehicle and identifies the vehicle.

12. A vehicle and destination guidance system in accordance with claim 10, wherein a credit card can be inserted into the device of the vehicle, from which the toll can be deducted.

13. A vehicle and destination guidance system in accordance with claim 12, wherein the deduction of a fee can be performed after approval of the credit card.

14. A vehicle and destination guidance system in accordance with claim 10, further comprising means for automatic registration of the license plates of the vehicle in case of an invalid credit card.

* * * * *

UNITED STATES PATENT AND TRADEMARK OFFICE

CERTIFICATE OF CORRECTION

PATENT NO. : 5,508,917

DATED : April 16, 1996

INVENTOR(S) : SIEGLE et al.

It is certified that error appears in the above-indentified patent and that said Letters Patent is hereby corrected as shown below:

Title page, Item [86]:

line 2, after "Sect. 371 Date:" change "March 24, 1994" to --April 27, 1993--;

line 3 after "Sect. 102(e) Date:" change "March 24, 1994" to --April 27, 1993--

Signed and Sealed this

Twenty-eighth Day of January, 1997

*Attest:*

BRUCE LEHMAN

*Attesting Officer* *Commissioner of Patents and Trademarks*